Feb. 11, 1969 W. L. SHEVEL, JR 3,427,602
MAGNETIC SYSTEMS WITH MEMORY ELEMENTS CONSISTING OF
TUBULAR MAGNETIC MEMBERS ARRANGED IN APERTURE FORM
Filed Oct. 26, 1964

INVENTOR
WILBERT L. SHEVEL, JR.

BY Stephen J. Limanek
ATTORNEY

United States Patent Office 3,427,602

Patented Feb. 11, 1969

3,427,602

MAGNETIC SYSTEMS WITH MEMORY ELEMENTS CONSISTING OF TUBULAR MAGNETIC MEMBERS ARRANGED IN APERTURE FORM

Wilbert L. Shevel, Jr., Peekskill, N.Y., assignor to International Business Machines Corporation, Armonk, N.Y., a corporation of New York Filed Oct. 26, 1964, Ser. No. 406,420

U.S. Cl. 340—174 18 Claims

Int. Cl. G11b 5/00

ABSTRACT OF THE DISCLOSURE

The memory includes memory elements each of which is formed of four tubular magnetic members arranged to form an aperture. One winding is threaded through the aperture and the other windings are threaded through the tubular members. These windings are energized to store information by orienting the flux around the aperture in different directions and to read out the information stored; the windings may also be energized in different combinations to write information by orienting the flux around one or more of the tubular members. The magnetic switching for both write and read in either case is by rotation of magnetic moments so that high speed operation is obtained.

This invention relates to magnetic memory systems and more particularly to a magnetic memory system employing a plurality of tubular components and electrical conductors coupled thereto for operation in a three dimensional mode as well as in a two dimensional mode.

Magnetic core matrixes having rectangular hysteresis loop characteristics have been used as the basic component of data processing apparatus for storing digital data. It is desirable that the cores have optimum switching characteristics so that the operation of the matrix is both fast and reliable. Efforts to increase the switching speeds of such cores have generally resulted in an increase of cost in fabrication. As is known the cross sectional area of a core is an important factor in the time required to switch or reverse the magnetization in the core. The smaller the cross sectional area of the core, the smaller is the total flux switched, but at the same time the cost of fabrication and the difficulty of threading and packaging such cores increases with decrease in size.

Discrete ferrite cores have been produced and formed into arrays by a difficult and expensive threading process. When an attempt is made to improve the performance of arrays by utilizing cores having a smaller cross sectional area, the task of assembling the arrays becomes increasingly tedious and costly.

In order to simplify the fabrication process for constructing memory arrays, continuous batch fabricated techniques have been proposed which may be used with automated devices. One method for simplifying the process of producing arrays includes the step of extruding tubular members of ferrite material, overlaying tiers comprising a plurality of tube segments in the desired assembly and wiring the assembly. Electrical conductors or wires are then simply threaded through the tubular members each of which passes through a large number of storage positions or cells. For a more detailed description of the tubular memory array and of the method of making the array, reference may be had to a commonly assigned Patent No. 159,127 issued Mar. 1, 1966 to W. L. Shevel, Jr., O. A. Gutwin and K. R. Grebe.

Another method of making tubular memory arrays, described in commonly assigned U.S. Patent No. 3,237,283, issued Mar. 1, 1966 to J. M. Brownlow and K. R. Grebe, includes coating an electrical conductor with a wax like material and then coating it with a ferrite resin mixture, next forming a first set of the thus coated conductors in a parallel arrangement, overlaying a second set of the thus coated parallel conductors at a 90° angle to the conductors of the first set, joining the two sets of conductors at intersecting points and then curing and sintering this structure. The array of magnetic circuit elements thus prepared has properties in the region of the intersections or cross points of the wire conductors suitable for magnetic storage in digital computer devices.

It is an object of this invention to provide a magnetic memory system having an improved mode of operation.

It is a further object of this invention to provide an improved magnetic memory system which may be operated in a three dimensional scheme as well as in a two dimensional scheme.

It is another object of this invention to provide a three dimensional magnetic memory system which is reliable in operation, easy to fabricate and extremely fast with respect to switching time.

Yet another object of this invention is to provide a three dimensional magnetic core memory system which readily lends itself to continuous batch fabrication techniques both in the production of the array and the wiring thereof.

In accordance with the present invention, a system is produced which includes a first pair of elongated members each made of high magnetic remanence material forming a first tier, a second pair of elongated magnetic members forming a second tier, the elongated members contacting each other to form an aperture defining a closed magnetic path passing through each of the members, a plurality of electrical conductors disposed in said elongated members along the longitudinal axes thereof, an additional electrical conductor disposed within the aperture and means for passing current through the conductors to vary the magnetization in the members.

An important advantage of the system of the present invention is that it provides a two or three dimensional magnetic core memory system which may be made in its entirety by continuous batch fabrication techniques.

An important feature of this invention is that a two or three dimensional magnetic core memory system is provided which operates by a fast magnetic rotational process.

The foregoing and other objects, features and advantages of the invention will be apparent from the following more particular description of preferred embodiments of the invention, as illustrated in the accompanying drawings.

Figure 1:
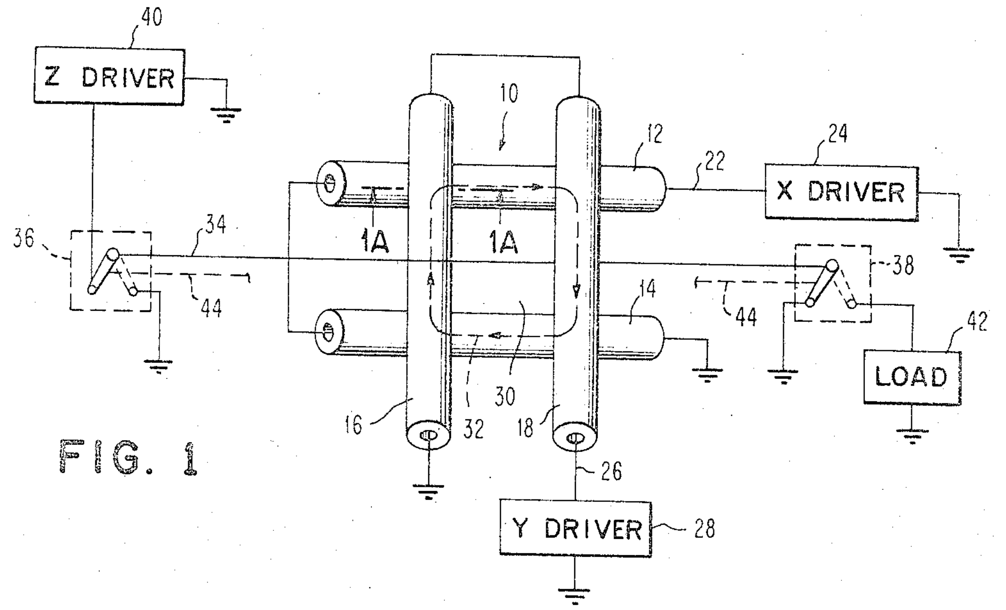
FIG. 1 illustrates a first embodiment of the system of the present invention wherein a plurality of tubes are employed to store one binary digit of information.
Figure 1A:
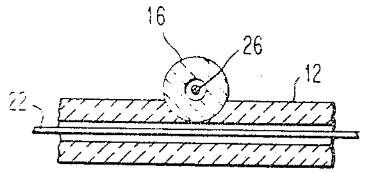
FIG. 1A is a cross section of a portion of the system illustrated in FIG. 1 taken along the line 1A–1A.
Figure 1B:
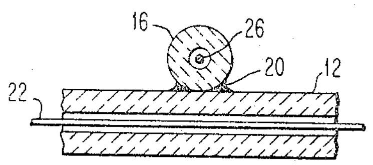
FIG. 1B is a cross section indicating a modification of the cross section shown in FIG. 1A.

Referring to the drawings in more detail, there is illustrated in FIG. 1 the first embodiment of the present invention which includes a storage cell 10 formed by a first pair of parallelly arranged tubular magnetic members 12, 14 and a second pair of parallelly arranged tubular magnetic members 16, 18 disposed at substantially a 90° angle with respect to the first pair of tubular members 12, 14. The tubular members 12, 14, 16, 18 are in contact with each other at points of intersection by disposing each of the second pair of tubular members 16, 18 in a recess of each of the first pair of tubular members 12, 14 in the manner illustrated in FIG. 1A. Alternatively, the second pair of tubular members 16, 18 may be held in physical contact with the first pair of tubular members 12, 14 by bonding the second pair of tubular members 16, 18 to the first pair of tubular members 12, 14 by any suitable magnetic cement 20, as illustrated in FIG. 1B of the drawing. A first electrical conductor 22 is disposed within both the tubular members of the first pair 12, 14 as shown in FIG. 1. The first electrical conductor 22 is connected at one end to an X driver 24 and at the other end to ground. A second electrical conductor 26 is disposed within both the tubular members of the second pair 16, 18. The second electrical conductor 26 is connected at one end to a Y driver 28 and at the other end to ground. As can be seen in FIG. 1, the tubular members 12, 14, 16, 18 form an aperture 30 which defines a magnetic path 32. A third electrical conductor 34 passes through the aperture 30 and is connected at one end to a first switching means 36 and at the other end to a second switching means 38. The first switching means 36 is operative to selectively connect the one end of the third electrical conductor 34 to a Z driver 40 or to ground and the second switching means 38 is operative to selectively connect the other end of the third electrical conductor 34 to a load 42, which may be any suitable sense amplifier, or to ground. Any suitable linkage 44 may intercouple the first and second switching means 36 and 38 as to operate these switching means simultaneously.

In the operation of the embodiment of the system illustrated in FIG. 1 of the drawing, to store, for example, a 1 binary digit or bit of information, magnetically, such as indicated by the direction of the magnetization of the magnetic path 32, that is, orientation in the clockwise direction with respect to aperture 30, a first current pulse is passed through the first conductor 22 from the X driver 24 to magnetize the first pair of tubular members 12 and 14 in a circumferential direction about conductor 22, a second current pulse is passed through the second electrical conductor 26 from the Y driver 28 to magnetize the second pair of tubular members 16 and 18 in a circumferential direction about the second conductor 26 and a third current pulse is passed, simultaneously with the first and second currents, via the first and second switching means 36 and 38, through the third electrical conductor 34 from the Z driver 40 so as to produce a circumferential flux about the third electrical conductor 34 in a clockwise direction about the aperture 30, as indicated by the arrows of magnetic path 32, through each of the first and second pairs of tubular members 12, 14, 16 and 18. In order to write a 0 bit of information into the storage or memory cell 10 illustrated in FIG. 1 of the drawing, current is passed through the first and second electrical conductors 22 and 26 as described hereinabove but a current of opposite polarity to that used to write a 1 bit of information is passed through the third conductor 34 so as to produce a magnetic field about the aperture 30 in a counterclockwise direction for directing the magnetization in path 32 in the counterclockwise direction. To read out information from the storage cell 10 of the system of the embodiment of FIG. 1, the first and second switching means 36 and 38 are operated so as to connect the load 42 to the third conductor 34 and current pulses are passed simultaneously through the first and second electrical conductors 22 and 26 from the X and Y drivers 24 and 28, respectively. A 1 or 0 bit of stored information is indicated by a voltage of a given polarity or of an opposite polarity to that of the given polarity, respectively, on conductor 34 which now acts as a sense line connected to the load or sense amplifier 42.

The switching operation in the system of FIG. 1 is very rapid since the magnetic dipoles of the magnetic material of the tubular members 12, 14, 16 and 18 are not reversed by the conventional, relatively slow wall motion employed in the normal core switching operation. In this system the magnetic dipoles in the magnetic path 32 are oriented from a substantially longitudinal direction of each tubular member to a circumferential direction by current pulses in conductors 22 and 26 to dispose the dipoles at a 90° angle with respect to the orientation of the dipoles in the storage position. When the current pulse passes through the third conductor 34 the dipoles are directed again toward the longitudinal axis of the respective tubular members in a given or opposite direction depending upon the polarity of the current pulse in the third conductor 34. Accordingly, it can be seen that the drive currents employed in the system of the present invention produce a rotational switching process which is known to be very rapid.

Figure 2:
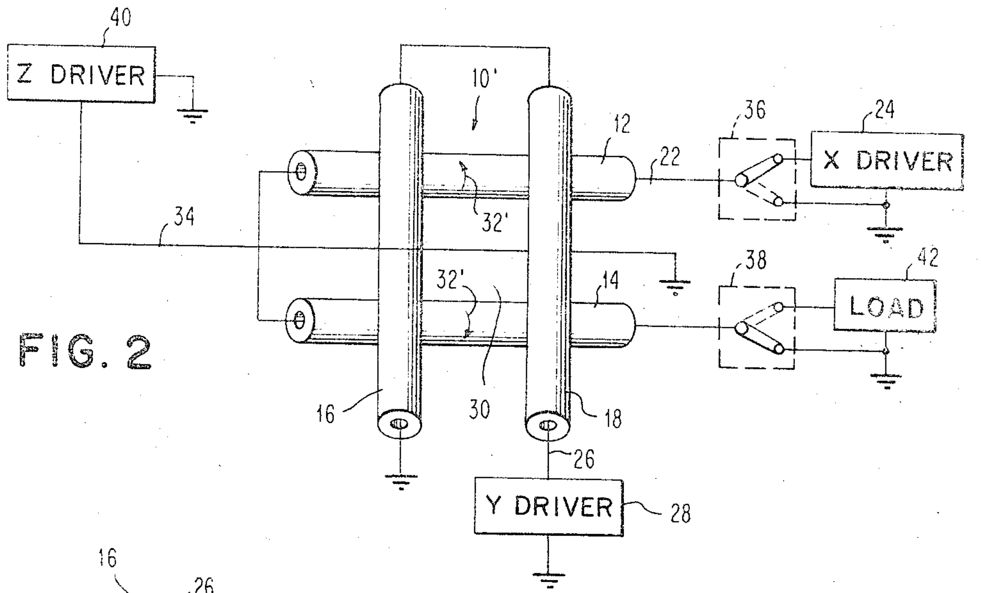
FIG. 2 illustrates a second embodiment of the invention wherein a binary digit of information is stored in each of two tubular members.

The second embodiment of the system of the present invention illustrated in FIG. 2 of the drawing includes a storage cell 10' formed by the first and second pairs of tubular magnetic members 12, 14, 16 and 18 arranged in the manner described hereinabove in connection with the embodiment of FIG. 1. The magnetic material of the system of FIG. 2 is arranged similar to that of the system of the embodiment of FIG. 1 but the electrical circuitry of the system of FIG. 2 differs from that of the embodiment of FIG. 1. In the embodiment of FIG. 2, the first electrical conductor 22 is disposed within both the tubular members of the first pair 12, 14 but one end thereof is connected to the first switching means 36 and the other end thereof is connected to the second switching means 38. The first switching means 36 is operative to selectively connect the first electrical conductor 22 to the X driver 24 or to ground and the second switching means 38 is operative to selectively connect the first electrical conductor 22 to the load 42 or to ground. The second electrical conductor 26 and the Y driver 28 are interconnected as in the embodiment of FIG. 1. The third conductor 34 is disposed within the aperture 30 with one end connected to ground and the other connected directly to the Z driver 40. Any suitable linkage means may be used to intercouple the first and second switching means 36 and 38 for simultaneous operation thereof.

In the operation of the second embodiment of the system of the present invention illustrated in FIG. 2 of the drawing, to store, for example, a 1 binary digit of information in the storage cell 10', magnetically, the magnetization of the first pair of tubular members 12, 14 is oriented circumferentially about the conductor 22 in a clockwise direction viewed from the X driver 24, as indicated by the arrows 32'. In order to produce this circumferential magnetization, a current pulse is passed through the third conductor 34 from the Z driver 40 to magnetize the first and second pairs of tubular members 12, 14, 16 and 18 along the longitudinal axis of the respective tubular members about the aperture 30. On or after the onset of the current pulse from the Z driver 40 and prior to the termination thereof a current pulse of a given polarity is passed through the first conductor 22 from the X driver 24 to magnetize the first pair of tubular members 12 and 14 in the clockwise direction about conductor 22. A current pulse is passed through the second conductor 26 from the Y driver 28 after the termination of the current pulse from the Z driver to produce a circumferential magnetization in the second pair of tubular members 16, 18 about the second conductor 26 which destroys the magnetization about aperture 30 produced by the magnetic field set up by the current pulse in the third conductor 34. In order to write a 0 bit of information into the storage cell 10′ illustrated in FIG. 2 of the drawing, current is passed through the second and third electrical conductors 26 and 34 as described hereinabove in connection with the operation of the second embodiment for storing a 1 bit of information, but a current of opposite polarity to that used to write a 1 bit of information in the first pair of tubular members 12, 14 is passed through the first conductor 22 so as to produce a magnetic field about the first conductor 22 in a counterclockwise direction when viewed from the X driver 24 to direct the magnetization in the first pair of tubular members 12, 14 in the opposite direction to that indicated by the arrows 32′. To read out information from the storage cell 10′ of the embodiment of FIG. 2, the first and second switching means 36 and 38 are operated so as to connect the load 42 to the first conductor 22 and then a current pulse is passed through the third conductor 34 from the Z driver 40. A 1 or 0 bit of stored information is indicated by a voltage of a given polarity or of an opposite polarity to that of the given polarity, respectively, on conductor 22 which now serves the function of a sense line connected to the sense amplifier 42. Again it can be seen that the switching operation of the system of the present invention is very rapid in the embodiment of FIG. 2 as it was in the embodiment of FIG. 1, since the magnetic dipoles of the magnetic material of the first pair of tubular members 12, 14 are reversed or switched by the rotational switching process. In the embodiment of FIG. 2, the magnetic dipoles circumferentially arranged around the first conductor 22, as indicated at 32′, are oriented in a clockwise direction and switched to a counterclockwise direction or vice versa with the aid of a transverse field produced by the current pulse in the third conductor 34 to provide the fast rotational switching. It can be seen that the second pair of tubular magnetic members 16, 18 are utilized to provide a low reluctance path for the magnetization set up by the current pulse in the third conductor 34 about the aperture 30 which provides the transverse field in the first pair of tubular members 12, 14.

Figure 3:
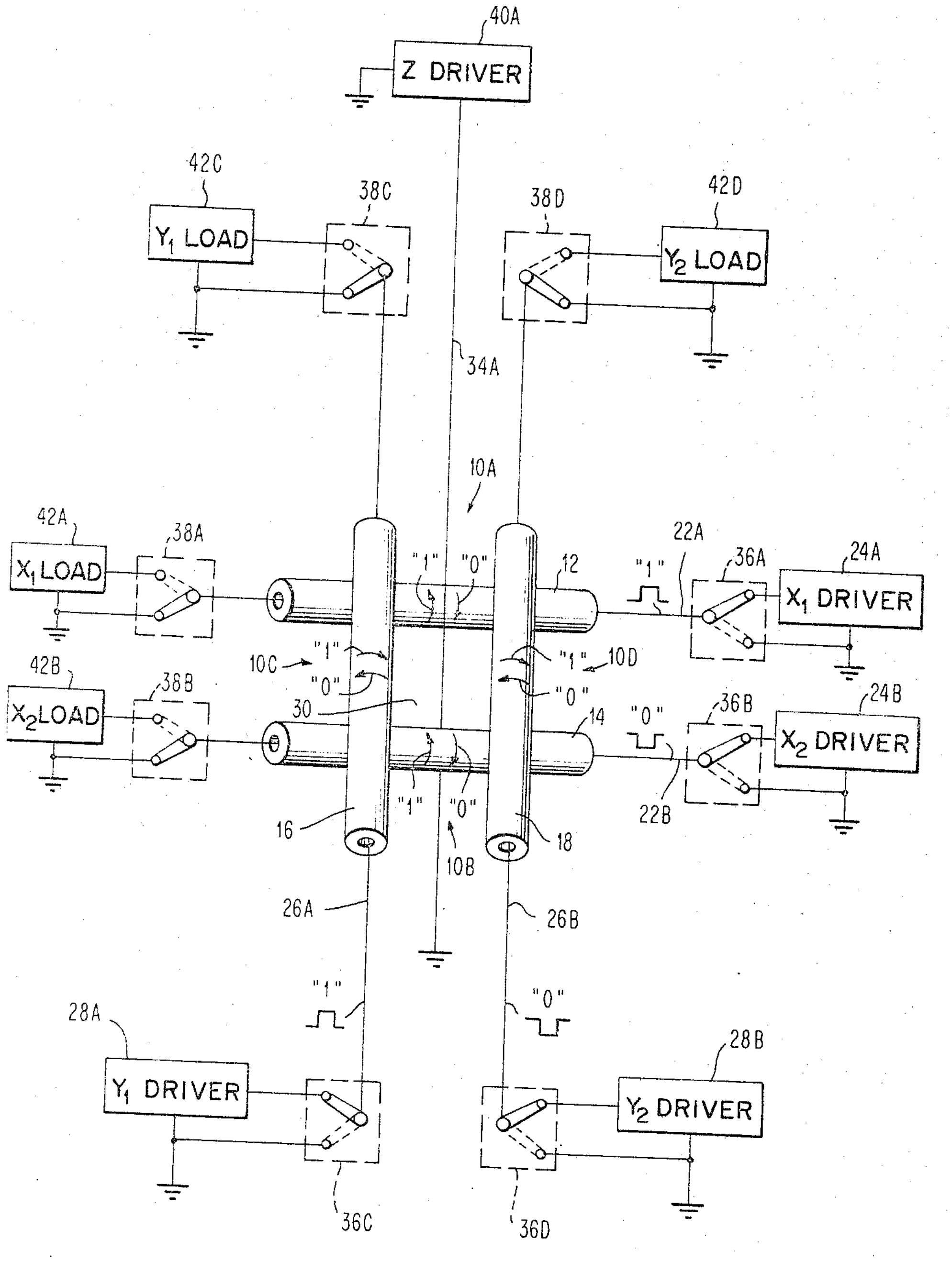
FIG. 3 is a third embodiment of the system of the present invention wherein one binary digit of information is stored in each of four intersecting tubular members.

The third embodiment of the system of the present invention illustrated in FIG. 3 of the drawing includes first, second, third and fourth storage cells 10A, 10B, 10C and 10D utilizing the tubular magnetic members 12, 14, 16 and 18, respectively. These tubular members 12, 14, 16 and 18 are arranged in a manner similar to that described hereinabove in connection with the embodiments illustrated in FIGS. 1 and 2, of the drawing. The electrical circuitry of the embodiment of FIG. 3 includes a first electrical conductor 22A disposed within one member 12 of the first pair of tubular members 12, 14 with one end thereof connected to a first switching means 36A and the other end thereof connected to a second switching means 38A. The first switching means 36A is operative to selectively connect the first conductor 22A to an $X_1$ driver 24A or to ground and the second switching means 38A is operative to selectively connect the first conductor 22A to an $X_1$ load 42A which may be a conventional sense amplifier or to ground. A second electrical conductor 22B is disposed within the other member 14 of the first pair of tubular members 12, 14 with one end thereof connected to a third switching means 36B and the other end connected thereof to a fourth switching means 38B. The third switching means 36B is operative to selectively connect one end of the second conductor 22B to an $X_2$ driver 24B or to ground and the fourth switching means 38B is operative to selectively connect the other end of the second conductor 22B to an $X_2$ load 42B or to ground. The circuitry of the embodiment of FIG. 3 further includes a third electrical conductor 26A disposed within one member 16 of the second pair of tubular magnetic members 16, 18 with one end thereof connected to a fifth switching means 36C and the other end thereof is connected to a sixth switching means 38C. The fifth switching means 36C is operative to selectively connect one end of the third conductor 26A to a $Y_1$ driver 28A or to ground, and the sixth switching means 38C is operative to selectively connect the third conductor 26A to a $Y_1$ load 42C or to ground. A fourth electrical conductor 26B is disposed within the other member 18 of the second pair of tubular magnetic members 16, 18 with one end thereof being connected to a seventh switching means 36D and the other end thereof being connected to an eighth switching means 38D. The seventh switching means 36D is operative to selectively connect one end of the fourth conductor 26B to a $Y_2$ driver 28B or to ground and the eighth switching means 38D is operative to selectively connect the other end of the fourth conductor 26B to a $Y_2$ load 42D or to ground. A fifth conductor 34A is disposed within the aperture 30 with one end thereof connected to a Z driver 40A and the other end connected to ground. Any suitable linkage means may be used to intercouple the first to eighth switching means 36A, 36B, 36C, 36D, 38A, 38B, 38C and 38D for simultaneous operation thereof.

In the operation of the third embodiment of the system of the present invention illustrated in FIG. 3 of the drawing, to store, for example, a 1 binary digit of information, magnetically in the storage cell 10A, the magnetization of the one tubular member 12 is oriented circumferentially about the first conductor 22A in a clockwise direction when viewed from the $X_1$ driver 24A, as indicated in FIG. 3 of the drawing. In order to produce this circumferential magnetization, a current pulse is passed through the fifth conductor 34A from the Z driver 40A to magnetize the one tubular member 12 along the longitudinal axis of the member 12 about the aperture 30 and on or after the onset of the current pulse from the Z driver 40A and prior to the termination thereof, a current pulse of a given polarity is passed through the first conductor 22A from the $X_1$ driver 24A to magnetize the one tubular member 12 in the clockwise direction. In order to write a 0 bit of information in the storage cell 10A, current is passed through the fifth conductor 34A as described hereinabove and a current of opposite polarity to that of the given polarity used to write a one bit of information is passed through the first conductor 22A so as to produce a magnetic field about the first conductor 22A in a counterclockwise direction when viewed from the $X_1$ driver 24A to direct the magnetization in the one tubular member 12 in the opposite direction or counterclockwise. To read out information from the storage cell 10A of the embodiment of FIG. 3, the first and second switching means 36A and 38A are operated so as to connect the $X_1$ load 42A to the first conductor 22A and then a current pulse is passed through the fifth conductor 34A from the Z driver 40A. A 1 or 0 bit of stored information is indicated by a voltage of a given polarity or of an opposite polarity to that of the given polarity, respectively, on the first conductor 22A which now functions as a sense line connected to the sense amplifier 42A.

Once again it can be seen that the switching operation in the system of the present invention is very rapid in the embodiment of FIG. 3 as it was in the embodiments of FIGS. 1 and 2, since the magnetic dipoles of the magnetic material of the one tubular member 12 are reversed or switched by the rotational switching process due to the use of the transverse magnetic field produced by the current pulse in the fifth conductor 34A. It also can be seen that the other member 14 of the first pair of tubular magnetic members 12, 14 and the second pair of tubular magnetic members 16, 18 are utilized to provide a low reluctance path for the magnetization set up by the current pulse in the fifth conductor 34A.

The second storage cell 10B which utilizes the other member 14 of the first pair of tubular magnetic members 12, 14 is driven in a manner similar to that described hereinabove in connection with the operation of the first storage cell 10A but by the $X_2$ driver 24B along with the Z driver 40A. The information stored in storage cell 10B is read out with the aid of the Z driver 40A and the proper operation of the third and fourth switching means 36B and 38B in the $X_2$ load 42B. The one member 12 of the first pair of tubular magnetic members 12, 14 and the second pair of tubular magnetic members 16, 18 are utilized to provide a low reluctance path for the magnetization set up by the current pulse in the fifth conductor 34A which provides the transverse field in the other member 14 of the first pair of tubular members 12, 14.

The third storage cell 10C which utilizes one member 16 of the second pair of tubular magnetic members 16, 18 and circuitry including the third conductor 26A, the fifth and sixth switching means 36C and 38C, the $Y_1$ driver 28A, the $Y_1$ load 42C and the Z driver 40A along with a fifth conductor 34A is operated in a manner similar to that described in connection with storage cells 10A and 10B. The fourth storage cell 10D utilizes the other member 18 of the second pair of tubular magnetic members 16, 18 and circuitry including the fourth conductor 26B, the seventh and eighth switching means 36D and 38D, the $Y_2$ driver 28B, the $Y_2$ load 42D and the Z driver 40A along with the fifth conductor 34A. The operation of the fourth storage cell 10D is similar to that described hereinabove in connection with the first, second and third storage cells 10A, 10B and 10C. It should be noted that the four storage cells 10A, 10B, 10C and 10D may be written into simultaneously with the simultaneous passage of currents of appropriate polarities through the first, second, third and fourth electrical conductors 22A, 22B, 26A and 26B along with the passage of current through the fifth electrical conductor 34A which produces a transverse field simultaneously in each of the four cells 10A, 10B, 10C and 10D. Likewise, after appropriate operation of the switching means 36A, 36B, 36C, 36D, 38A, 38B, 38C and 38D, information may be read out simultaneously from the four storage cells 10A, 10B, 10C and 10D by simply passing a current from the Z driver 40A through the fifth conductor 34A and detecting the output signals in the loads 42A, 42B, 42C and 42D, respectively.

Figure 4:
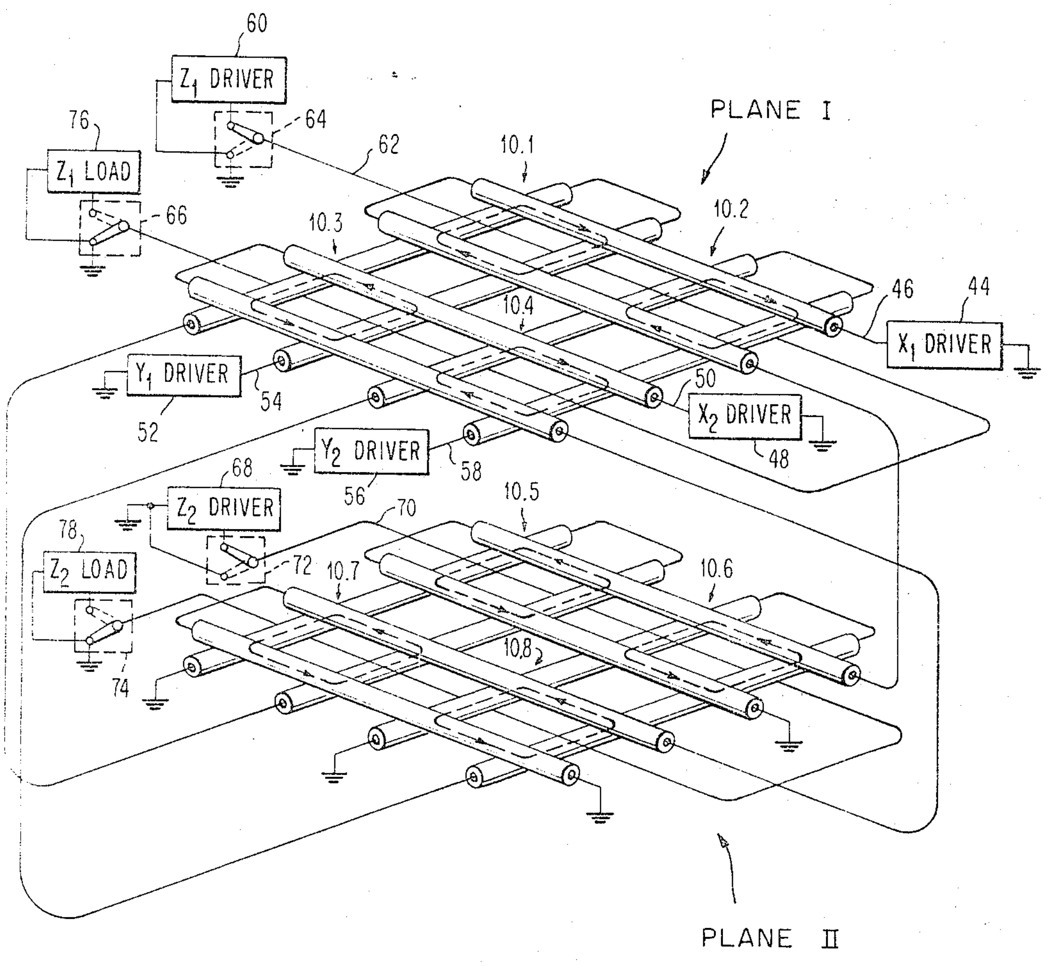
FIG. 4 illustrates a magnetic memory system having a plurality of planes each of which includes storage cells of the type illustrated in FIG. 1 of the drawing.

In FIG. 4 of the drawing there is illustrated an embodiment of the system of the present invention which includes a plurality of planar arrays identified as Plane I and Plane II each having a plurality of storage cells, Plane I having storage cells 10.1, 10.2, 10.3 and 10.4 and Plane II having storage cells 10.5, 10.6, 10.7 and 10.8. The embodiment of the system is organized in a three dimensional scheme with each of the storage cells 10.1–10.8 being formed in a manner similar to that illustrated in FIG. 1 of the drawing. The storage cells in one of the three dimensions are driven by an $X_1$ driver 44 coupled to a first electrical conductor 46 and an $X_2$ driver 48 coupled to a second electrical conductor 50. The storage cells 10.1, 10.2, 10.5 and 10.6 are driven by the $X_1$ driver 44 and the storage cells 10.3, 10.4, 10.7 and 10.8 are driven by the $X_2$ driver 48. The storage cells in a second of the three dimensions are driven by a $Y_1$ driver 52 which is connected to a third electrical conductor 54 and a $Y_2$ driver 56 which is connected to a fourth electrical conductor 58. The storage cells 10.1, 10.3, 10.5 and 10.7 are driven by the $Y_1$ driver 52 and the storage cells 10.2, 10.4, 10.6 and 10.8 are driven by the $Y_2$ driver 56. The storage cells of the planar arrays are driven in the third dimension by a $Z_1$ driver 60 coupled to a fifth electrical conductor 62 through a first switching means 64 and a second switching means 66 and a $Z_2$ driver 68 coupled to a sixth electrical conductor 70 through a third switching means 72 and a fourth switching means 74. The storage cells 10.1, 10.2, 10.3 and 10.4 are driven by the $Z_1$ driver 60 and the storage cells 10.5, 10.6, 10.7 and 10.8 are driven by the $Z_2$ driver 68. A $Z_1$ load 76 is also coupled to the fifth electrical conductor 62 through the operation of the first and second switching means 64 and 66 and a $Z_2$ load 78 is coupled to the sixth electrical conductor 70 through the operation of the third and fourth switching means 72 and 74.

In the operation of the embodiment illustrated in FIG. 4 of the drawing, a single storage cell is selected in each of the two planes I and II to form a selected word, for example, the storage cell 10.1 is selected in Plane I and the storage cell 10.5 is selected in Plane II for the selection of a two bit word in the embodiment of FIG. 4. When a 1 or 0 bit of information is to be written into the selected storage cells, that is, 10.1 of Plane I and 10.5 of Plane II, a current pulse from the $X_1$ driver 44 is passed through the first electrical conductor 46 and a current pulse from the $Y_1$ driver 52 is simultaneously passed through the third electrical conductor 54 to magnetize the magnetic material of cells 10.1 and 10.5 in a circumferential direction about the first and third electrical conductors 46 and 54. To write, for example, a 1 bit of information into the storage cell 10.1, a current pulse of a given polarity from the $Z_1$ driver 60 is passed through the fifth conductor 62 which tends to produce magnetization in the storage cell 10.1 in a clockwise direction, as viewed from the $Z_1$ driver 60. To store a 0 bit of information in the storage cell 10.5, a current pulse of opposite polarity to the given polarity from the $Z_1$ driver 60 is passed from the $Z_2$ driver 68 to the sixth electrical conductor 70 which tends to produce magnetization in the storage cell 10.5 in a counterclockwise direction as viewed from the $Z_2$ driver 68. It should be noted that the current pulses from the $Z_1$ and $Z_2$ drivers 60 and 68 pass through each of the other cells, however, since only the storage cells 10.1 and 10.5 are common to the currents flowing from the $X_1$, $Y_1$ and $Z_1$ drivers 44, 52 and 60, only the storage cells 10.1 and 10.5 are affected, the other storage cells remaining in their original magnetization states. Furthermore, since only cells 10.1 and 10.5 are common to currents flowing in both the first conductor 46 and the third electrical conductor 54 only these two cells have a transverse field in every segment of the cell. Accordingly, a relatively low magnetic field produced by current in the fifth and sixth conductors 62 and 70 is capable of reversing the magnetization in these two cells but is incapable of reversing the magnetization in the remaining cells. When the information stored in the storage cells 10.1 and 10.5 is to be read out, the $X_1$ and $Y_1$ drivers 44 and 52 are operated to pass a current through the first conductor 46 and the third conductor 54, respectively, to magnetize the magnetic material of the storage cells 10.1 and 10.5 in a circumferential direction about the first and third conductors 46 and 54. The output signals indicative of the stored information in the storage cells 10.1 and 10.5 are bipolar as stated hereinabove in connection with the description of the embodiment of FIG. 1 and are applied to the respective loads 76 and 78 by the proper operation of the switching means 64, 66, 72 and 74. Information is written into and read out of the remaining words 10.2–10.6, 10.3–10.7, and 10.4–10.8 in a manner similar to that described hereinabove in connection with the handling of information in the word 10.1–10.5 by passing current through each of the conductors associated with each of the storage cells of the particular word selected. Although only two planes I and II are illustrated in FIG. 4 of the drawing, it should be understood that more planes may be added, as desired, to increase the number of bits in a word. Also, more words may be added to the system by increasing the number of storage cells in each plane.

Figure 5:
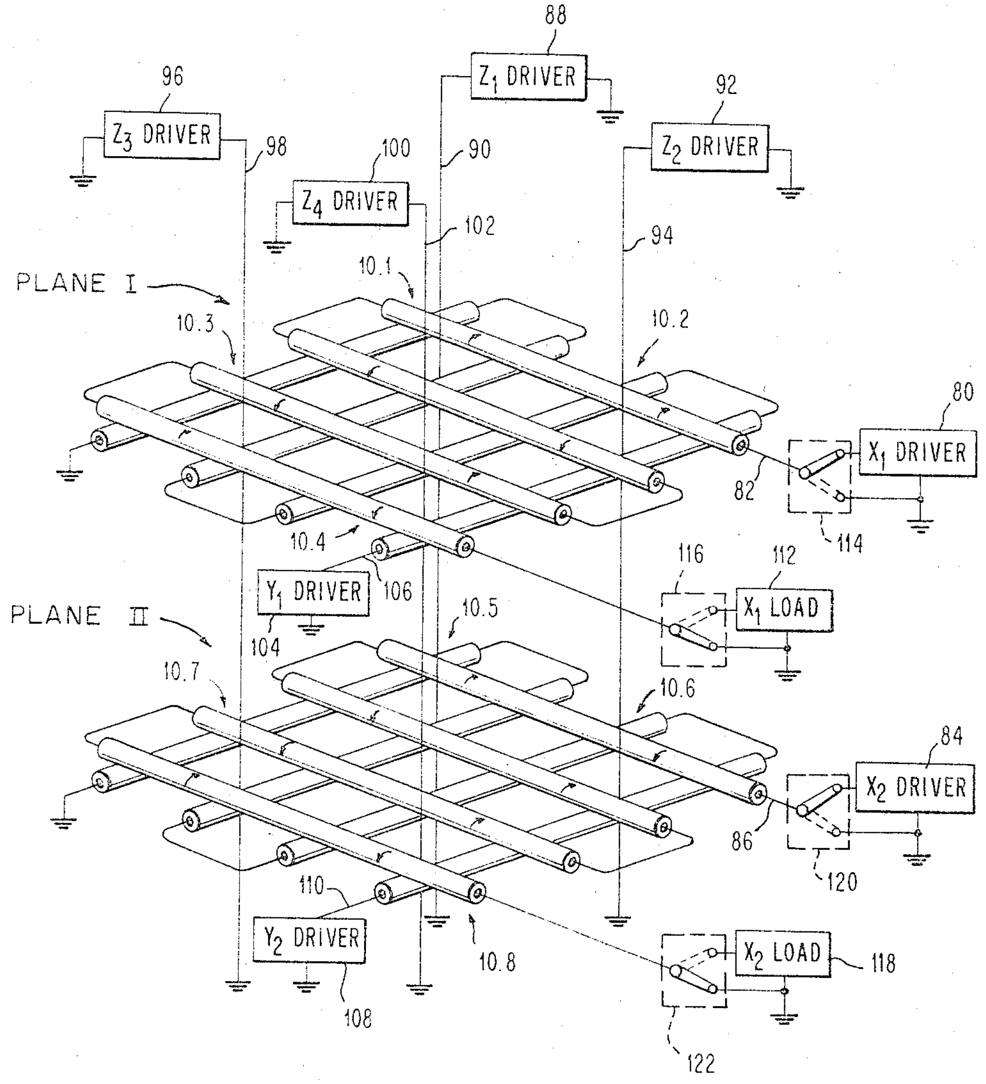
FIG. 5 illustrates a magnetic memory system having a plurality of planes each of which includes storage cells of the type illustrated in FIG. 2 of the drawing.

In FIG. 5 of the drawing there is illustrated another embodiment of the system of the present invention which includes a plurality of planar arrays identified as Plane I and Plane II each having a plurality of storage cells, Plane I having storage cells 10.1, 10.2, 10.3 and 10.4 and Plane II having storage cells 10.5, 10.6, 10.7 and 10.8. In the embodiment of the system of FIG. 5 each of the storage cells 10.1–10.8 is constructed and operated in a manner similar to that of the embodiment illustrated in FIG. 2 of the drawing. The magnetic material of the storage cells 10.1, 10.2, 10.3 and 10.4 of Plane I is driven by $X_1$ driver 80 coupled to a first electrical conductor 82 and the magnetic material of the storage cells 10.5, 10.6, 10.7 and 10.8 is driven by an $X_2$ driver 84 coupled to a second electrical conductor 86. The magnetic material of each of the storage cells 10.1–10.8 is also driven by a current pulse from a plurality of Z drivers each of which is coupled to an electrical conductor passing through one storage location of each of the planes, Plane I and Plane II. $Z_1$ driver 88 is coupled to a third electrical conductor 90 which is associated with the storage cells 10.1 and 10.5, $Z_2$ driver 92 is coupled to a fourth electrical conductor 94 which is associated with the storage cells 10.2 and 10.6, $Z_3$ driver 96 is coupled to a fifth electrical conductor 98 which is associated with the storage cells 10.3 and 10.7 and $Z_4$ driver 100 is coupled to a sixth electrical conductor 102 which is associated with the storage cells 10.4 and 10.8. A $Y_1$ driver 104 coupled to a seventh electrical conductor 106 produces current pulses which destroy the circumferential magnetization set up in each of the storage cells 10.1–10.4 of Plane I by the current pulses from the Z drivers 88, 92, 96 and 100 about the third, fourth, fifth and sixth electrical conductors 90, 94, 98 and 102, and a $Y_2$ driver 108 coupled to an eighth electrical conductor 110 produces current pulses which destroy the circumferential magnetization set up in the storage cells 10.5–10.8 of Plane II by the current pulses from the Z drivers 88, 92, 96 and 100 about the third, fourth, fifth and sixth electrical conductors 90, 94, 98 and 102. An $X_1$ load 112 is coupled to the first electrical conductor 82 through first and second switching means 114 and 116 and an $X_2$ load 118 is coupled to the second electrical conductor 86 through third and fourth switching means 120 and 122.

In the operation of the embodiment illustrated in FIG. 5 of the drawing, a single storage cell is selected in each of the planes, Plane I and Plane II, to form a selected word, for example, the storage cell 10.2 is selected in Plane I and the storage cell 10.6 is selected in Plane II for the selection of a two bit word in the embodiment of FIG. 5. When a 1 or 0 bit of information is to be written into the selected storage cells, a current pulse from the $Z_2$ driver 92 is passed through the third electrical conductor 94 to provide a transverse magnetic field and a current pulse of a given polarity from the $X_1$ driver 80 is simultaneously passed through the first electrical conductor 82 to magnetize the magnetic material of the storage cell 10.2 in a circumferential direction about the first electrical conductor 82, and a current pulse from the $X_2$ driver 84 is also simultaneously passed through the second electrical conductor 86 to magnetize the magnetic material of the storage cell 10.6 in a circumferential direction about the second electrical conductor 86. To write, for example, a 1 bit of information into the storage cell 10.2, a current pulse from the $Z_2$ driver 92 is passed through the third electrical conductor 94 to produce a circumferential magnetization about the third electrical conductor 94 in the magnetic material of the storage cell 10.2 and in particular to produce a transverse field in the magnetic material of the storage cell 10.2. Concurrently with the energization of the third electrical conductor 94, a current pulse of a given polarity from the $X_1$ driver 80 is passed through the first electrical conductor 82 to magnetize the magnetic material of the storage cell 10.2 in a clockwise direction about the first electrical conductor 82. To store a 0 bit of information in the storage cell 10.6, a current pulse of a polarity opposite to that of the given polarity from the $X_1$ driver 80 is passed from the $X_2$ driver 84 to the second electrical conductor 86 to produce a counterclockwise magnetization of the magnetic material of the storage cell 10.6 surrounding the second electrical conductor 86, while the third electrical conductor 94 is energized. It should be noted that the current pulse from the $X_1$ driver 80 and from the $X_2$ driver 84 passes through each of the other storage cells of Plane I and Plane II, however, since only the storage cells 10.2 and 10.6 are provided with a transverse field by the current pulse from the $Z_2$ driver 92, the magnetization of only the storage cells 10.2 and 10.6 is affected by the current pulses passing through the first electrical conductor 82 and the second electrical conductor 86, the other storage cells remaining in their original magnetization states. The $Y_1$ driver 104 and the $Y_2$ driver 108 supply a pulse to the seventh electrical conductor 106 and the eighth electrical conductor 110, respectively, after information is stored in the storage cells 10.2 and 10.6 in order to prevent the magnetization produced by the current pulse in the third electrical conductor 94 from distorting the information in the storage tubes of the storage cells 10.2 and 10.6. Thus, the remanent magnetization in the storage cells 10.2 and 10.6 is circumferential about the first electrical conductor 82 and the second electrical conductor 86, respectively, in a direction dependent upon whether a 0 or 1 bit of information has been stored in the particular cell. When the information stored in the storage cells 10.2 and 10.6 is to be read out, the $Z_2$ driver 92 applies a current pulse to the third electrical conductor 94 to magnetize the magnetic material of the storage cells 10.2 and 10.6 in a direction parallel to the first and second electrical conductors 82 and 86 at the storage cells 10.2 and 10.6 to produce bipolar output signals, indicative of the stored information in the storage cells 10.2 and 10.6, in the first electrical conductor 82 and the second electrical conductor 86, respectively, which are coupled to the $X_1$ load 110 and $X_2$ load 118 by appropriate operation of the first, second, third and fourth switching means 114, 116, 120 and 122. Information is written into and read out of the remaining words 10.1–10.5, 10.3–10.7 and 10.4–10.8 in a manner similar to that described hereinabove in connection with the handling of information in the word 10.2–10.6 by passing current through each of the conductors similarly associated with each of the storage cells of a particular word selected.

Figure 6:
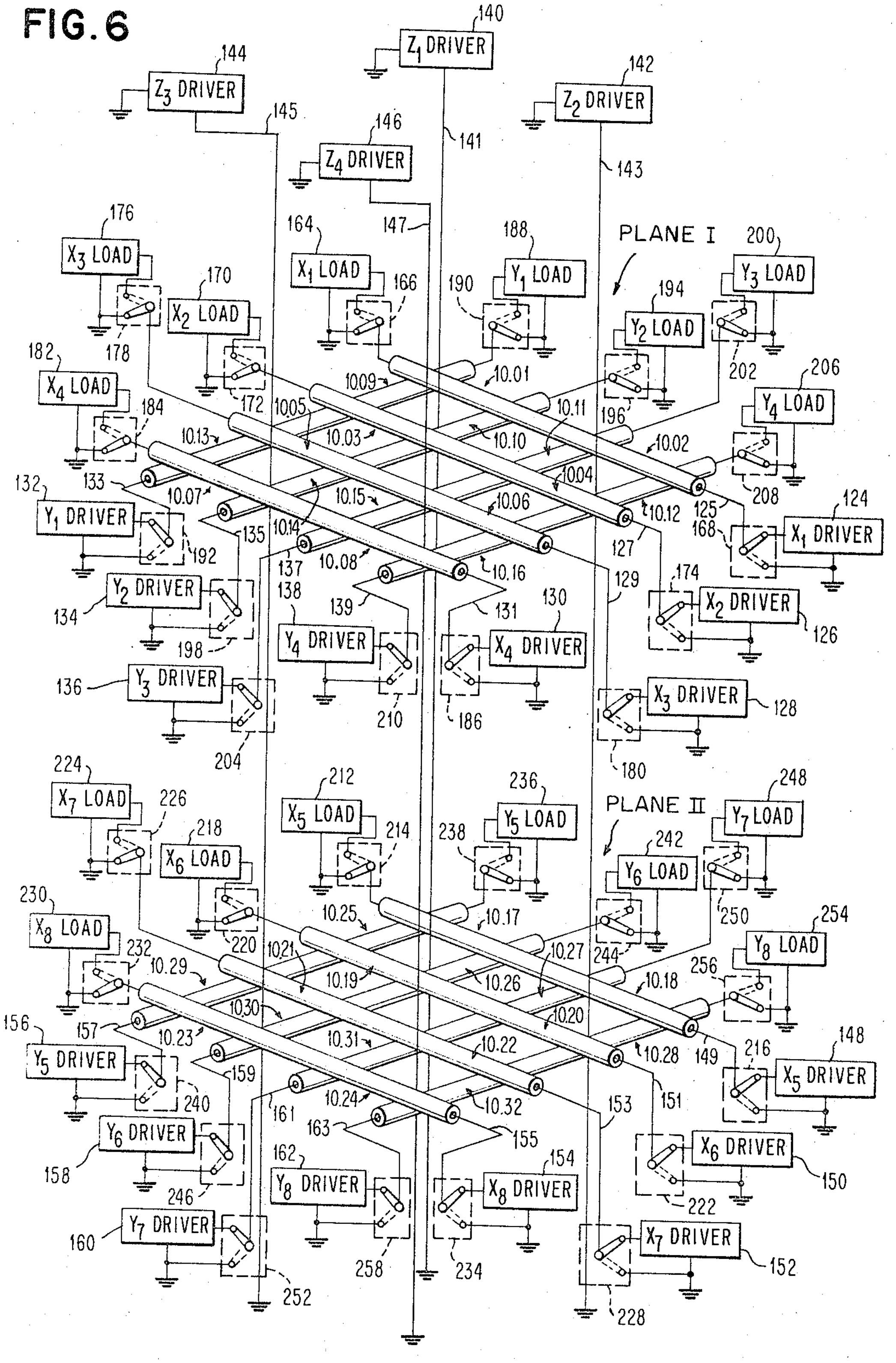
FIG. 6 illustrates a magnetic memory system having a plurality of planes each of which includes storage cells of the type illustrated in FIG. 3 of the drawing.

In FIG. 6 of the drawing there is illustrated a third embodiment of the system of the present invention which includes a plurality of planar arrays, identified as Plane I and Plane II, each having a plurality of storage cells. Plane I having storage cells 10.01–10.16 and Plane II having storage cells 10.17–10.32. In this embodiment of the system each of the storage cells 10.01–10.32 is constructed and operated in a manner similar to that of the embodiment illustrated in FIG. 3 of the drawing. The sixteen storage cells in Plane I are driven by four X drivers identified as $X_1$ driver 124 coupled to a conductor 125, $X_2$ driver 126 coupled to a conductor 127, $X_3$ driver 128 coupled to a conductor 129 and $X_4$ driver 130 coupled to a conductor 131, four Y drivers, $Y_1$ driver 132 coupled to a conductor 133, $Y_2$ driver 134 coupled to a conductor 135, $Y_3$ driver 136 coupled to a conductor 137 and $Y_4$ driver 138 coupled to a conductor 139 and four Z drivers identified as $Z_1$ driver 140 coupled to a conductor 141, $Z_2$ driver 142 coupled to a conductor 143, $Z_3$ driver 144 coupled to a conductor 145 and $Z_4$ driver 146 coupled to a conductor 147. The 16 storage cells of Plane II are driven by four X drivers identified as $X_5$ driver 148, $X_6$ driver 150, $X_7$ driver 152, $X_8$ driver 154, four Y drivers identified as $Y_5$ driver 156, $Y_6$ driver 158, $Y_7$ driver 160 and $Y_8$ driver 162 and the four Z drivers identified as $Z_1$ driver 140, $Z_2$ driver 142, $Z_3$ driver 144 and $Z_4$ driver 146. An $X_1$ load 164 is coupled to the conductor 125 through a pair of switching means 166 and 168 for reading out the information stored in the storage cells 10.01 and 10.02, an $X_2$ load 170 is coupled to the conductor 127 through a pair of switching means 172 and 174 for reading out the information stored in the storage cells 10.03 and 10.04, an $X_3$ load 176 is coupled to the conductor 129 through a pair of switching means 178 and 189 for reading out the information stored in the storage cells 10.05 and 10.06 and an $X_4$ load 182 is coupled to the conductor 131 through a pair of switching means 184 and 186 for reading out the information stored in the storage cells 10.07 and 10.08. A $Y_1$ load 188 is coupled to the conductor 133 through a pair of switching means 190 and 192 for reading out the information stored in the storage cells 10.09 and 10.13, a $Y_2$ load 194 is coupled to the conductor 135 through a pair of switching means 196 and 198 for reading out the information stored in the storage cells 10.10 and 10.14, a $Y_3$ load 200 is coupled to the conductor 137 through a pair of switching means 202 and 204 for reading out the information stored in the storage cells 10.11 and 10.15 and a $Y_4$ load is coupled to the conductor 139 through a pair of switching means 208 and 210 for reading out the information stored in the storage cells 10.12 and 10.16. The sixteen storage cells in Plane II and driven by four X drivers identified as $X_5$ driver 148 coupled to a conductor 149, $X_6$ driver 150 coupled to a conductor 151, $X_7$ driver 152 coupled to a conductor 153 and $X_8$ driver 154 coupled to a conductor 155, four Y drivers identified as $Y_5$ driver 156 coupled to a conductor 157, $Y_6$ driver 158 coupled to a conductor 159, $Y_7$ driver 160 coupled to a conductor 161 and $Y_8$ driver 162 coupled to a conductor 163 and four Z drivers identified as $Z_1$ driver 140 coupled to the conductor 141, $Z_2$ driver 142 coupled to the conductor 143, $Z_3$ driver 144 coupled to the conductor 145 and $Z_4$ driver 146 coupled to the conductor 147. An $X_5$ load is coupled to the conductor 149 through a pair of switching means 214 and 216 for reading out information stored in the storage cells 10.17 and 10.18, an $X_6$ load 218 is coupled to the conductor 151 through a pair of switching means 220 and 222 for reading out information stored in the storage cells 10.19 and 10.20, an $X_7$ load 224 is coupled to the conductor 153 through a pair of switching means 226 and 228 for reading out information stored in the storage cells 10.21 and 10.22 and an $X_8$ load 230 is coupled to the conductor 155 through a pair of switching means 232 and 234 for reading out information stored in the storage cells 10.23 and 10.24. A $Y_5$ load 236 is coupled to the conductor 157 through a pair of switching means 238 and 240 for reading out information stored in the storage cells 10.25 and 10.29, a $Y_6$ load 242 is coupled to the conductor 159 through a pair of switching means 244 and 246 for reading out information stored in storage cells 10.26 and 10.30, a $Y_7$ load 248 is coupled to the conductor 161 through a pair of switching means 250 and 252 for reading out information stored in storage cells 10.27 and 10.31 and a $Y_8$ load 254 coupled to the conductor 163 through a pair of switching means 256 and 258 for reading out information stored in storage cells 10.28 and 10.32.

In the operation of the embodiment of the invention illustrated in FIG. 6 of the drawing, a plurality of storage cells, i.e., each cell which is associated with a conductor coupled to a particular Z driver, is selected in each of the planes, Plane I and II, to form a selected word, for example, the storage cells 10.02, 10.04, 10.11 and 10.12 which are associated with the electrical conductor 143 connected to the $Z_2$ driver 142 are selected in Plane I and storage cells, 10.18, 10.20, 10.27 and 10.28 also associated with the conductor 143 connected to the $Z_2$ driver 142 are selected in Plane II for the overall selection of an 8-bit word having the storage cells 10.02, 10.04, 10.11, 10.12, 10.18, 10.20, 10.27 and 10.28. When a 1 or 0 bit of information is written into the eight selected storage cells, a current pulse from the $Z_2$ driver 142 is passed through the conductor 143 and a current pulse of a polarity corresponding to the information to be stored is simultaneously passed through the electrical conductors 125, 127, 137 and 139 for storing information in the storage locations 10.02, 10.04, 10.11 and 10.12 of Plane I and also simultaneously there is passed a current pulse of a polarity corresponding to the information to be stored through the electrical conductors 149, 151, 161, and 163 for writing information into the storage cells 10.18, 10.20, 10.27 and 10.28, respectively, in Plane II. It should be noted that current pulses used for writing information into the selected bits also pass through unselected storage cells, however, since the other storage cells do not have the benefit of a transverse field produced by the current pulse in the conductor 143 from the $Z_2$ driver 142, they remain in their original magnetized states. Accordingly, it can be seen that four storage cells 10.02, 10.04, 10.11 and 10.12 of Plane I and four storage cells 10.18, 10.20, 10.27 and 10.28 of Plane II are written into simultaneously with the remanent magnetization circumferentially disposed in a predetermined direction about an electrical conductor coupled to either an X or Y driver. When the information stored in the eight selected storage cells is to be read out, the $Z_2$ driver 142 applies a current pulse to the conductor 143 to magnetize the magnetic material of the selected storage cells in a direction transverse to the direction of remanent magnetization to produce bipolar output signals, indicative of the stored information in the selected storage cells, in the associated X and Y loads which are coupled to the selected storage cells by appropriate operation of the switching means. Information is written into and read out of the remaining words of the embodiment of the system illustrated in FIG. 6 of the drawing in a manner similar to that described hereinabove in connection with the handling of information in the word associated with the $Z_2$ driver 142 by passing current through each of the conductors similarly associated with each of the storage cells of a particular selected word.

The magnetic material of the storage cells and the process for forming the cells and arrays illustrated in FIGS. 1–6 of the drawing may be similar to that described in the above-identified Patents 3,237,283 and 3,229,265.

It should be understood that although the two digits of binary information may be represented by opposite directions of magnetization produced by bipolar current pulses as stated hereinabove, the two digits may also be represented by a magnetization set up by a unipolar current pulse for one digit of information with the other digit represented only by the transverse field, i.e., without the use of an information representing current pulse. Furthermore, in the operation of each of the embodiments of the invention described hereinabove it is preferable that the current pulse or pulses producing the transverse magnetic field be terminated prior to the termination of the current pulse which contains the information to be stored.

While the invention has been particularly shown and described with reference to preferred embodiments thereof, it will be understood by those skilled in the art that various changes in form and details may be made therein without departing from the spirit and scope of the invention.

What is claimed is:

1. A system comprising a plurality of elongated members each made of magnetic remanent material, said elongated members contacting each other to form an aperture defining a closed magnetic path passing through each of said members, a plurality of individually controllable electrical conductors disposed in different ones of said elongated members along the longitudinal axis thereof, an additional electrical conductor disposed within said aperture, means including said electrical conductors for varying the magnetization in said members, and means for detecting the magnetization in said members.

2. A system comprising a magnetic element having a first pair of parallel tubular members and a second pair of parallel tubular members interconnected to form an aperture, at least one of said members being made of material having magnetic flux remanence, means including a first conductor disposed within said aperture for applying a first magnetic field to said element circumferentially with respect to said aperture, means including a second conductor disposed within said first pair of tubular members for applying a second magnetic field to said first pair of members, means including a third electrical conductor disposed within said second pair of tubular members for applying a third magnetic field to said second pair of members, and means including means for individually energizing said first, second and third conductors for magnetizing said element to store information therein and for detecting the magnetizaton in said element.

3. A system as set forth in claim 2 wherein said detecting means includes said first conductor.

4. A system as set forth in claim 2 wherein said detecting means includes said second conductor.

5. A system as set forth in claim 2 wherein said first magnetic field is selectively of a given polarity or of a polarity opposite to said given polarity.

6. A system as set forth in claim 2 wherein said second magnetic field is selectively of a given polarity or of a polarity opposite to said given polarity.

7. A system comprising first and second parallel tubular members, third and fourth parallel tubular members connected with said first and second members to form an aperture, each of said members being made of material exhibiting magnetic flux remanence, means including a first conductor disposed within said aperture for applying a first magnetic field to each of said members circumferentially with respect to said aperture, means including a second conductor disposed within said first tubular member for applying a second magnetic field to said first member, means including a third conductor disposed within said second member for applying a second magnetic field to said second member, means including a fourth conductor disposed within said third tubular member for applying a second magnetic field to said third member, means including a fifth conductor disposed within said fourth tubular member for applying a second magnetic field to said fourth member, means including means for individually energizing said first, second, third, fourth and fifth conductors for selectively magnetizing said members to store information therein and for directing the magnetization in each of said members.

8. A system as set forth in claim 7 wherein each of said second magnetic fields is selectively of a given polarity or of an opposite to said given polarity.

9. A system as set forth in claim 7 wherein said detecting means includes said second, third, fourth and fifth conductors.

10. A system comprising first and second planar arrays each including a first series of tubular magnetic members arranged in parallel alignment, a second series of tubular magnetic members arranged in parallel alignment and disposed in contact with and at an angle with respect to said first series of members to form a plurality of apertures, at least one of said members forming each of said apertures being made of material having magnetic flux remanence, means including a first conductor disposed within given apertures of said plurality of apertures of said first array for applying a first magnetic field to said members of said first planar array circumferentially with respect to each of said given apertures of said first array, means including a second conductor disposed within given apertures of said plurality of apertures of said second array for applying a first magnetic field to said members of said second planar array circumferentially with respect to said given apertures of said second array, means including a third conductor disposed within first and second adjacent tubular members of said first series of each of said first and second planar arrays for applying a second magnetic field thereto, means including a further conductor disposed within third and fourth adjacent tubular members of said first series of each of said first and second planar arrays for applying a second magnetic field thereto, means including a fifth conductor disposed within first and second tubular members of said second series of each of said first and second planar arrays for applying a second magnetic field thereto, means including a sixth conductor disposed within third and fourth adjacent tubular members of said second series of each of said first and second arrays for applying a second magnetic field thereto, and means for detecting the magnetization in said members.

11. A system as set forth in claim 10 wherein said first magnetic field is selectively of a given polarity or of a polarity opposite to said given polarity.

12. A system as set forth in claim 10 wherein said detecting means includes at least one of said first and second conductors and at least one of said second field applying means.

13. A system comprising first and second planar arrays each including a first series of tubular magnetic members arranged in parallel alignment, a second series of tubular magnetic members arranged in parallel alignment and disposed in contcat with and at an angle with respect to said first series of members to form a plurality of apertures, at least one of said members forming each of said apertures being made of material exhibiting magnetic flux remanence, means including a first conductor disposed within a first of said apertures in each of said first and second planar arrays for applying to said members forming said first aperture a first magnetic field circumferentially with respect to each of said first apertures, means including a second conductor disposed within a second of said apertures in each of said first and second planar arrays for applying to said members forming said second aperture a first magnetic field circumferentially with respect to each of said second apertures, means including a third conductor disposed within a third of said apertures in each of said first and second planar arrays for applying to said members forming said third aperture a first magnetic field circumferentially with respect to each of said third apertures, means including a fourth conductor disposed within a fourth of said apertures in each of said first and second planar arrays for applying to said members forming said fourth aperture a first magnetic field circumferentially with respect to each of said fourth apertures, means including a fifth conductor disposed within each of said first series tubular members of said first array for applying a second magnetic field thereto, means including a sixth conductor disposed within each of said first series tubular members of said second planar array for aplying a second magnetic field thereto, means including a seventh conductor disposed within each of said second series tubular members of said first planar array for applying a second magnetic field thereto, means including an eighth conductor disposed within each of said second series tubular members of said second planar array for applying a second magnetic fiield thereto, and means for detetcing the magnetization in said members.

14. A system as set forth in claim 13 wherein each said second magnetic fields is selectively of a given polarity or of a polarity opposite to said given polarity.

15. A system as set forth in claim 13 wherein said detecting means includes at least one of said sixth and seventh conductors and at least one of said first magnetic field applying means.

16. A system comprising first and second planar arrays each including a first series of tubular magnetic members arranged in parallel alignment, a second series of tubular magnetic members arranged in parallel alignment and disposed in contact with and at an angle with respect to said first series of members to form a plurality of apertures, each of said members being made of material having magnetic flux remanence, means including a first conductor disposed within a first of said apertures in each of said first and second planar arrays for applying to said members forming said first aperture a first magnetic field circumferentially with respect to each of said first apertures, means including a second conductor disposed within a second of said apertures in each of said first and second planar arrays for applying to said members forming said second aperture a first magnetic field circumferentially with respect to each of said second apertures, means including a third conductor disposed within a third of said apertures in each of said first and second planar arrays for applying to said members forming said third aperture a first magnetic field circumferentially with respect to each of said third apertures, means including a fourth conductor disposed within a fourth of said apertures in each of said first and second planar arrays for applying to said members forming said fourth aperture a first magnetic field circumferentially with respect to each of said fourth apertures, means including a plurality of conductors each disposed within a different one of said members for applying a second magnetic field to each of said members, and means for detecting the magnetization in said members.

17. A system as set forth in claim 16 wherein each of said second magnetic fields is selectively of a given polarity or of a polarity opposite to said given polarity.

18. A system as set forth in claim 16 wherein said detecting means includes at least one of said plurality of conductors and at least one of said first magnetic field applying means.

References Cited

UNITED STATES PATENTS

| | | | |
|---|---|---|---|
| 3,229,265 | 1/1966 | Brownlow et al. ---- | 340—174 |
| 3,300,767 | 1/1967 | Davis et al. -------- | 340—174 |

BERNARD KONICK, *Primary Examiner.*

B. L. HALEY, *Assistant Examiner.*